United States Patent
Osborne

(10) Patent No.: US 10,711,568 B2
(45) Date of Patent: Jul. 14, 2020

(54) VALVE WITH SHUTTLE FOR USE IN FLOW MANAGEMENT SYSTEMS

(71) Applicant: Lawrence Osborne, Acton, CA (US)

(72) Inventor: Lawrence Osborne, Acton, CA (US)

( * ) Notice: Subject to any disclaimer, the term of this patent is extended or adjusted under 35 U.S.C. 154(b) by 0 days.

(21) Appl. No.: 16/383,517

(22) Filed: Apr. 12, 2019

(65) Prior Publication Data

US 2019/0234181 A1    Aug. 1, 2019

Related U.S. Application Data

(60) Continuation of application No. 13/746,279, filed on Jan. 21, 2013, now Pat. No. 10,273,779, which is a division of application No. 12/766,141, filed on Apr. 23, 2010, now Pat. No. 8,545,190.

(51) Int. Cl.
| | |
|---|---|
| *E21B 34/08* | (2006.01) |
| *E21B 43/12* | (2006.01) |
| *F16K 17/04* | (2006.01) |
| *F16K 17/196* | (2006.01) |

(52) U.S. Cl.
CPC ........... *E21B 34/08* (2013.01); *E21B 43/121* (2013.01); *F16K 17/0406* (2013.01); *F16K 17/0473* (2013.01); *F16K 17/196* (2013.01); *Y10T 137/2544* (2015.04); *Y10T 137/2557* (2015.04)

(58) Field of Classification Search
CPC ...... E21B 34/08; E21B 43/121; F16K 17/196; F16K 17/0473; F16K 17/0406; Y10T 137/2544; Y10T 137/2557
See application file for complete search history.

(56) References Cited

U.S. PATENT DOCUMENTS

| | | |
|---|---|---|
| 2,367,682 A | 1/1945 | Kehle |
| 2,386,765 A | 10/1945 | Adams et al. |
| 2,610,859 A | 9/1952 | Warren |
| 3,027,907 A | 4/1962 | Lee |
| 3,034,527 A | 5/1962 | Hennells |
| 3,851,414 A | 12/1974 | Miculka |
| 3,967,635 A | 7/1976 | Sealfon |
| 4,041,970 A | 8/1977 | Peters |
| 4,057,074 A | 11/1977 | Fischer |
| 4,294,328 A | 10/1981 | Cholet |
| 4,460,048 A | 7/1984 | Smith |
| 5,439,022 A | 8/1995 | Summers et al. |
| 5,694,965 A | 12/1997 | Roulet |
| 6,289,990 B1 | 9/2001 | Dillon et al. |
| 6,779,543 B2 | 8/2004 | Hollister |
| 7,431,042 B2 | 10/2008 | Huang |
| 2011/0259438 A1 | 10/2011 | Osborne |

*Primary Examiner* — Eric Keasel
(74) *Attorney, Agent, or Firm* — Paul D. Chancellor; Ocean Law

(57) ABSTRACT

A valve with a shuttle for use in a flow management system is capable of bypassing a backflow.

10 Claims, 4 Drawing Sheets

VALVE WITH SHUTTLE FOR USE IN FLOW MANAGEMENT SYSTEMS

PRIORITY CLAIM

This application is a continuation of U.S. patent application Ser. No. 13/746,279 filed Jan. 21, 2013 which is a divisional patent application of U.S. patent application Ser. No. 12/766,141 filed Apr. 23, 2010, now U.S. Pat. No. 8,545,190 and entitled VALVE WITH SHUTTLE FOR USE IN A FLOW MANAGEMENT SYSTEM.

BACKGROUND OF THE INVENTION

Field of the Invention

The present invention relates to a system for managing a fluid flow. In particular, the system includes a valve with a shuttle for managing a fluid flow.

Discussion of the Related Art

Pumps and valves located in hard to reach places present maintenance and maintenance downtime issues. Where pumps and valves are used to produce a natural resource such as a hydrocarbon, downtime can result in lost production and increased expenses for workmen and materials.

In particular, downhole production strings including pumps and valves for lifting fluids such as particulate laden liquids and slurries present a maintenance problem. Here, both pumps and valves can lose capacity and in cases be rendered inoperative when conditions including fluid conditions and fluid velocities fall outside an intended operating range. Such unintended operating conditions can foul, plug, and damage equipment.

The oil and gas industry is familiar with these production equipment problems and has in cases benefited from equipment designed to mitigate production process upsets. However, once this industry adopts a particular equipment design, it is slow to consider improvements for reasons including familiarity with existing equipment and the risk associated with using the untested equipment of market newcomers.

Production string bypass valves are one such example. Old designs are familiar and trusted to increase production process reliability. Despite a potential to further improve reliability using improved bypass valves, the industry chooses instead to maintain the status quo, buying the same types of bypass valves year after year.

Improvements in production string bypass valves are needed together with a willingness to adopt improved designs that increase production process reliability.

SUMMARY OF THE INVENTION

The present invention includes a valve with a shuttle and is intended for use in a flow management system.

In an embodiment, a valve body includes a spill port and a shuttle is located in a chamber of the valve body. The shuttle has a through hole extending between a shuttle closure end and a shuttle spring end. A first seat and a first seat closure are located in the through hole. Second and third seats are located in the valve body chamber and second and third seat closures are located on the shuttle closure end. A spring is located substantially between the shuttle spring end and a fixture coupled to the valve body. The valve is operable to pass a flow entering the through hole at the shuttle spring end and to spill a flow that closes the first seat closure. In some embodiments, the circumference of the second seat is greater than the circumference of the third seat and the circumference of the shuttle spring end is more than two times greater than the circumference of the third seat.

In an embodiment, a valve body includes a spill port and a shuttle located in a chamber of the valve body. The shuttle has a through hole extending between a shuttle closure end and a shuttle spring end. A valve center line is shared by the valve body and the shuttle. A first seat is located on a first face of the shuttle and there is a first seat closure. The first seat closure has a central bore for accepting a rotatable shaft extending through the valve body and the first seat closure is for translating along the rotatable shaft. A second seat is located in the valve body chamber and a second seat closure is located on a second face of the shuttle. A spring is located substantially between the shuttle spring end and a valve body support. The valve is operable to pass a flow entering the through hole at the shuttle spring end and to spill a flow that closes the first seat closure.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed invention.

To the extent parts, components and functions of the described invention exchange fluids, the associated interconnections and couplings may be direct or indirect unless explicitly described as being limited to one or the other. Notably, indirectly connected parts, components and functions may have interposed devices and/or functions known to persons of ordinary skill in the art.

Figures 1, 2:
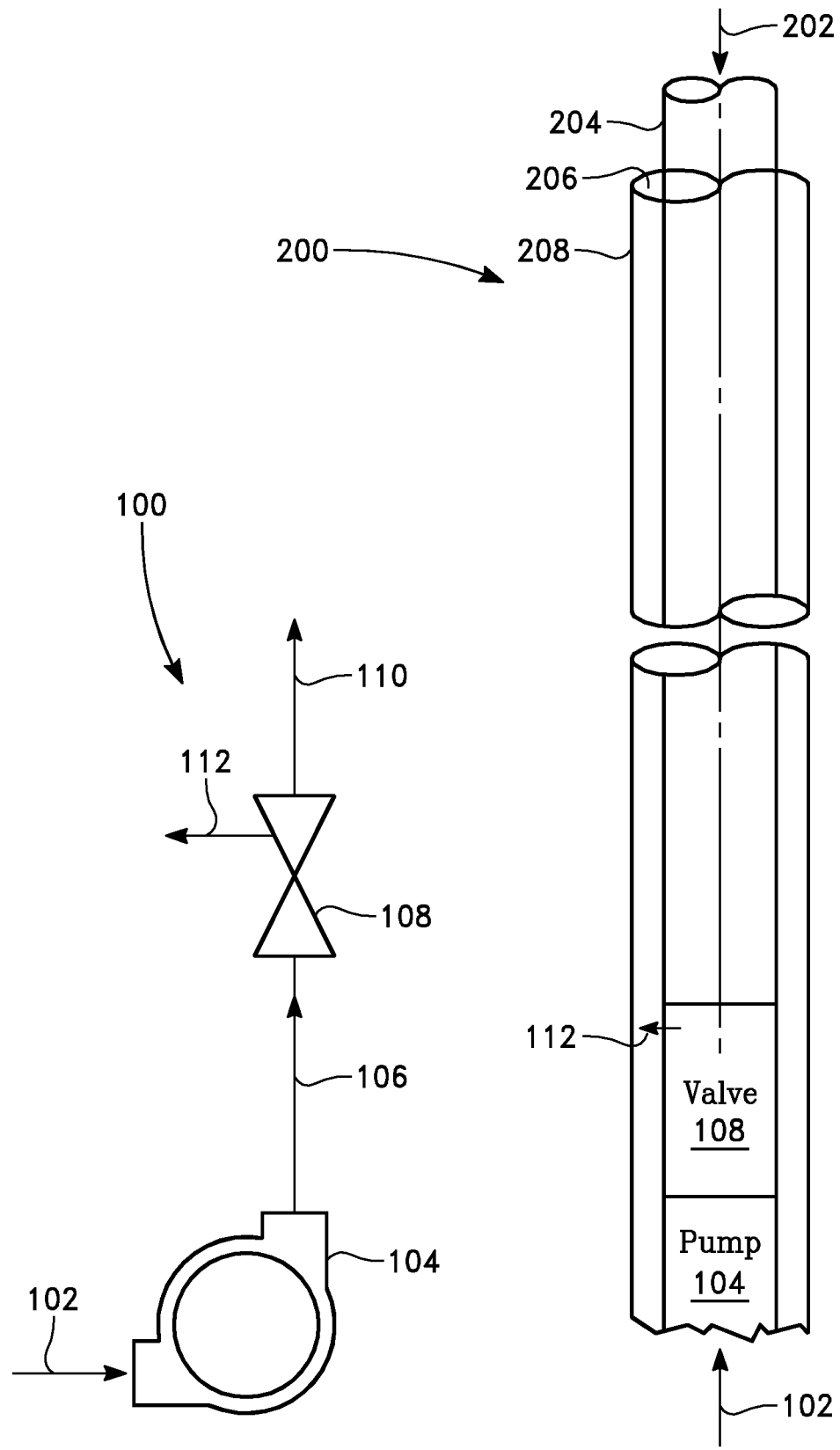
FIG. 1 is a schematic diagram of a valve in a flow management system in accordance with the present invention.
FIG. 2 is a diagram of the flow management system of FIG. 1.

FIG. 1 shows an embodiment of the invention 100 in the form of a schematic diagram. A bypass valve 108 is interconnected with a pump 104 via a pump outlet 106. The pump includes a pump inlet 102 and the valve includes a valve outlet 110 and a valve spill port 112. In various embodiments, the inlets, outlets and ports are one or more of a fitting, flange, pipe, or similar fluid conveyance.

FIG. 2 shows a section of a typical downhole production string 200. The production string includes the bypass valve 108 interposed between the pump 104 and an upper tubing string 204. In some embodiments, a casing 208 surrounds one or more of the tubing string, valve, and pump. Here, an annulus 206 is formed between the tubing string and the casing. A production flow is indicated by an arrow 102 while a backflow is indicated by an arrow 202. In various embodiments, the bypass valve serves to isolate backflows from one or more of the valve, portions of the valve, and the pump.

Figure 3:
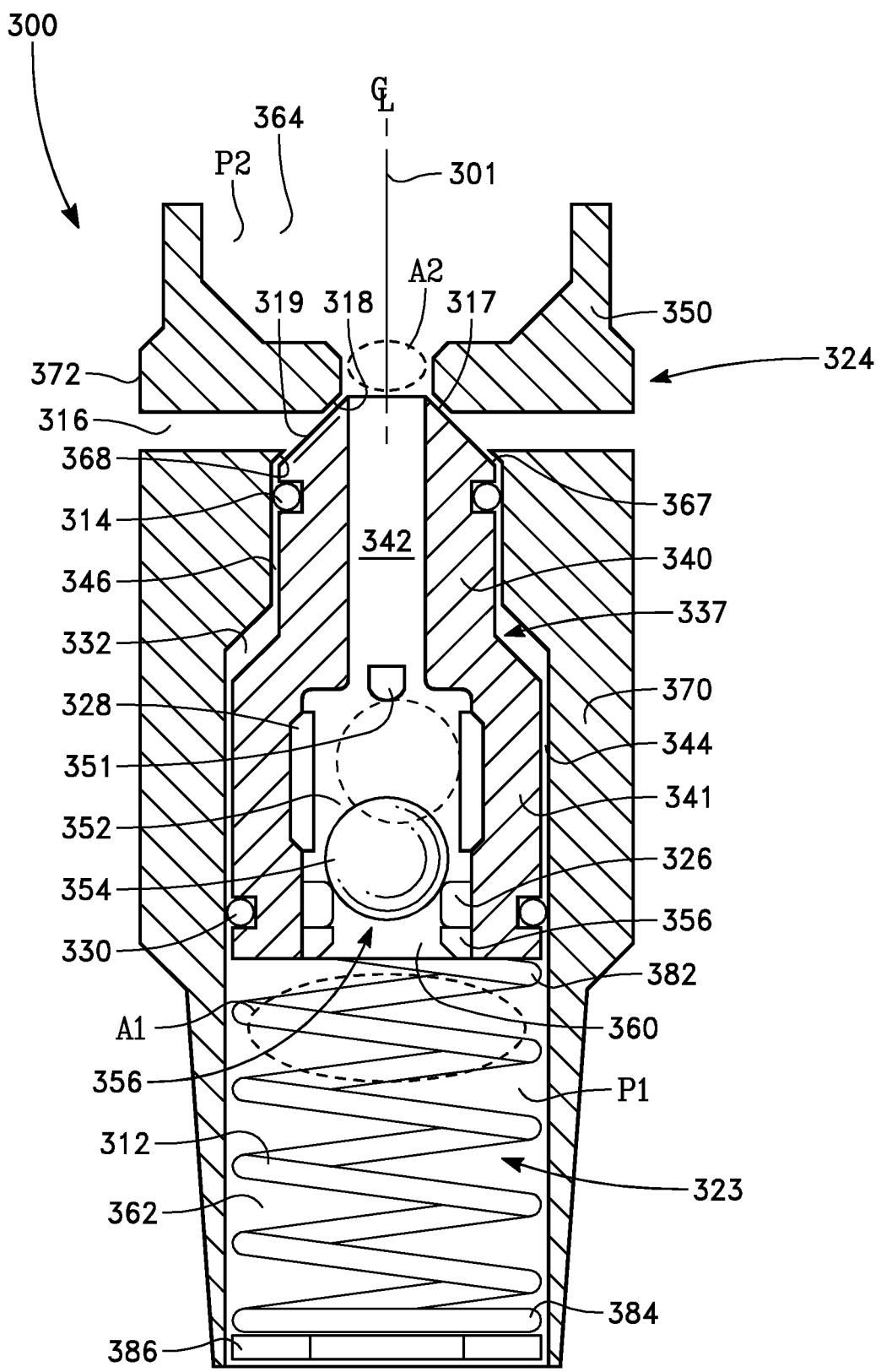
FIG. 3 is a cross-sectional view of a valve of the flow management system of FIG. 1.

FIG. 3 shows a first bypass valve 300. A valve body 324 houses components including a valve shuttle 337 and a charge spring 312. The valve body has a central chamber 323.

The shuttle 337 includes an upper section 340 adjacent to a lower section 341. In an embodiment, the central chamber includes a first bore 344 for receiving the lower shuttle section and a second bore 346 for receiving the upper shuttle section. In embodiments where the first and second bore diameters are different, a grease space 332 may be provided between the shuttle 337 and the valve body section 370 (as shown). In other embodiments, the first and second bore diameters are substantially the same and there is no grease space.

Upper and lower seals 314, 330 are fitted circumferentially to the upper shuttle section and the lower shuttle section 340, 341. In an embodiment, the seals have a curved cross-section such as a circular cross-section (as shown). In another embodiment, the seals have a rectangular cross-section.

Figure 5:
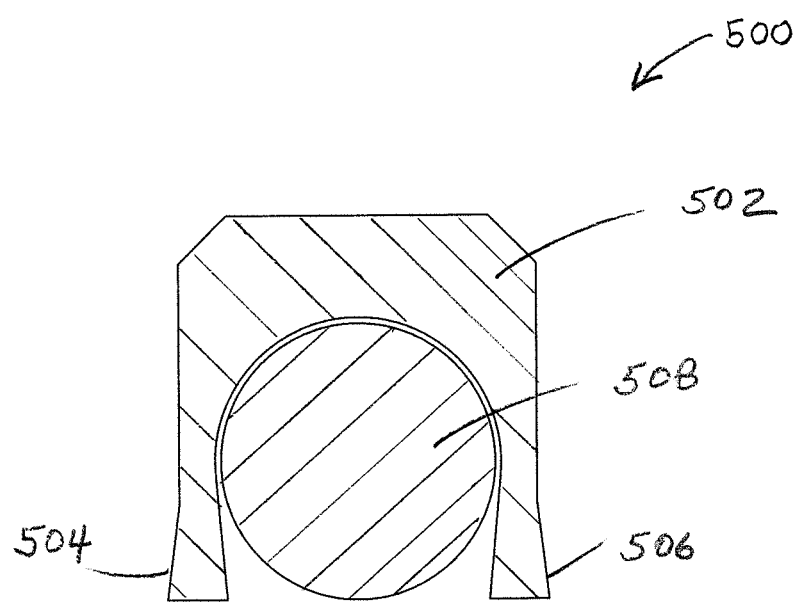
FIG. 5 is a cross-sectional view of a seal of the flow management system of FIG. 1.

In some embodiments, one or more seals 314, 330 have a structure 500 similar to that shown in FIG. 5. Here, a seal body 502 such as a polymeric body has inner and outer lip seals 506, 504 and substantially envelops a charge O-ring 508 such as a silicon rubber ring.

In various embodiments, the seals 314, 330 are made from one or more of a rubber, plastic, metal, or another suitable material known to persons of ordinary skill in the art. For example, seal materials include silicone rubber, elastomers, thermoplastic elastomers, and metals that are soft in comparison to the valve body 324, the selection depending, inter alia, on the valve application. In an embodiment, the seals are made from ultra high molecular weight polyethylene.

The shuttle has a through-hole 356 including an upper through-hole section 342 and a lower through-hole section 352. Upper and lower through-hole ports 362, 360 bound a flow path through the shuttle 337. In an embodiment, the upper through-hole cross-section is smaller than the lower through hole cross-section.

Located near the lower through-hole section is a first seat closure 354, a first seat 326, and a seat retainer 356. In an embodiment, the first seat is about radially oriented with respect to the valve body centerline 301.

In an embodiment, the first seat closure 354 is a plug. In various embodiments, the first seat closure is spherically shaped, conically shaped, elliptically shaped, or shaped in another manner known to persons of ordinary skill in the art. And, in an embodiment, the first seat closure is substantially spherically shaped. The closure is movable with respect to the shuttle 337 within a cage 328. When resting against the first seat 326, the first closure seals the lower through-hole port 360. In an embodiment, a stabilizer near an upper end of the cage 351 prevents the closure from blocking the passage comprising the upper and lower through-hole sections 342, 352 when the closure is near the upper end of the cage 390.

Located near an upper valve body section 350 is a second seat 318. In an embodiment, the second seat is about radially oriented with respect to the valve body centerline 301.

A second seat closure 317 is located at an upper end of the shuttle 337. In an embodiment, the second seat closure is located on a peripheral, sloped face of the shuttle 319. In various embodiments, the second seat closure is spherically shaped, conically shaped, elliptically shaped, or shaped in another manner known to persons of ordinary skill in the art. And, in an embodiment, the second seat closure is substantially frustro-conically shaped. The closure is movable with the shuttle along a line substantially parallel to a centerline of the valve body 301.

Located near an upper valve body section 350 is a third seat 368. In an embodiment, the third seat is about radially oriented with respect to the valve body centerline 301. About radially arranged and located between the second and third seats 318, 368, are one or more spill ports 316 extending between a valve body exterior 372 and the valve body central chamber 323.

A third seat closure 367 is located at an upper end of the shuttle 337. In an embodiment, the third seat closure is located on a peripheral, sloped face of the shuttle 319. In various embodiments, the third seat closure is spherically shaped, conically shaped, elliptically shaped, or shaped in another manner known to persons of ordinary skill in the art. And, in an embodiment, the second seat closure is substantially frustro-conically shaped. The closure is moveable with the shuttle along a line substantially parallel to a centerline of the valve body 301.

The second and third seat closures 317, 367 are formed to simultaneously close the second and third seats 318, 368. When resting against the second and third seats 318, 368, the second closure establishes a flow path between a variable volume valve chamber below the shuttle 362 and an upper valve chamber above the second seat 364 while the third closure blocks flow in the spill port 316. When moved away from the second seat, the second closure unblocks flow in the spill port.

Tending to bias the shuttle 337 upward is the charge spring 312. In various embodiments, the charge spring is about radially oriented with respect to the valve body centerline 301 and is seated 384 on an annular fixture supported by the valve body 386. In various embodiments, the fixture is In an embodiment, an upper end of the spring 382 presses against the shuttle.

In normal operation, forces on the shuttle determine the position of the shuttle.
 a. The spring exerts an upward force on the shuttle.
 b. The shuttle exerts a downward weight related force on the spring.
 c. A lower chamber pressure P1 is applied to a lower fluid exposed area of the shuttle A1 resulting in an upward force on the shuttle.
 d. An upper chamber pressure P2 is applied to an upper fluid exposed area of the shuttle A2 resulting in a downward force on the shuttle The equilibrium position of the shuttle in the valve body 324 is determined by the forces acting on the shuttle.

For example, when the pump 104 is lifting fluid through the valve 300, the spring constant k of the charge spring 312, the area A1, and the area A2 are selected to cause a net upward force on the shuttle tending to move the shuttle to its uppermost position, sealing the spill ports 316. At the same time, the rising fluid lifts the first closure away from its seat. These actions establish a flow path through the shuttle. In an embodiment, A1 is greater than A2. And, in an embodiment, A1 is about three times larger than A2.

When fluid lifting stops or falls below a threshold value, the net force on the shuttle tends to move the shuttle away from its uppermost position. At the same time, insufficient rising fluid causes the first closure 354 to come to rest against the first seat 326. These actions unblock the spill ports 316 and establish a fluid flow path from the upper chamber 364 to the spill port(s) 316 while blocking the flow path through the shuttle.

From the above, it can be seen insufficient fluid flow, no fluid flow, or reverse fluid flow cause the valve 300 and pump 104 to be removed from the fluid circuit and/or isolated from the fluid column above the shuttle 337. A benefit of this isolation is protection of the valve and pump. One protection afforded is protection from solids, normally rising with the fluid but now moving toward the valve and pump, that might otherwise foul or block one or both of these components. Blocking the shuttle flow path and opening the spill ports 316 removes these solids outside the tubing string 204.

Figure 4:
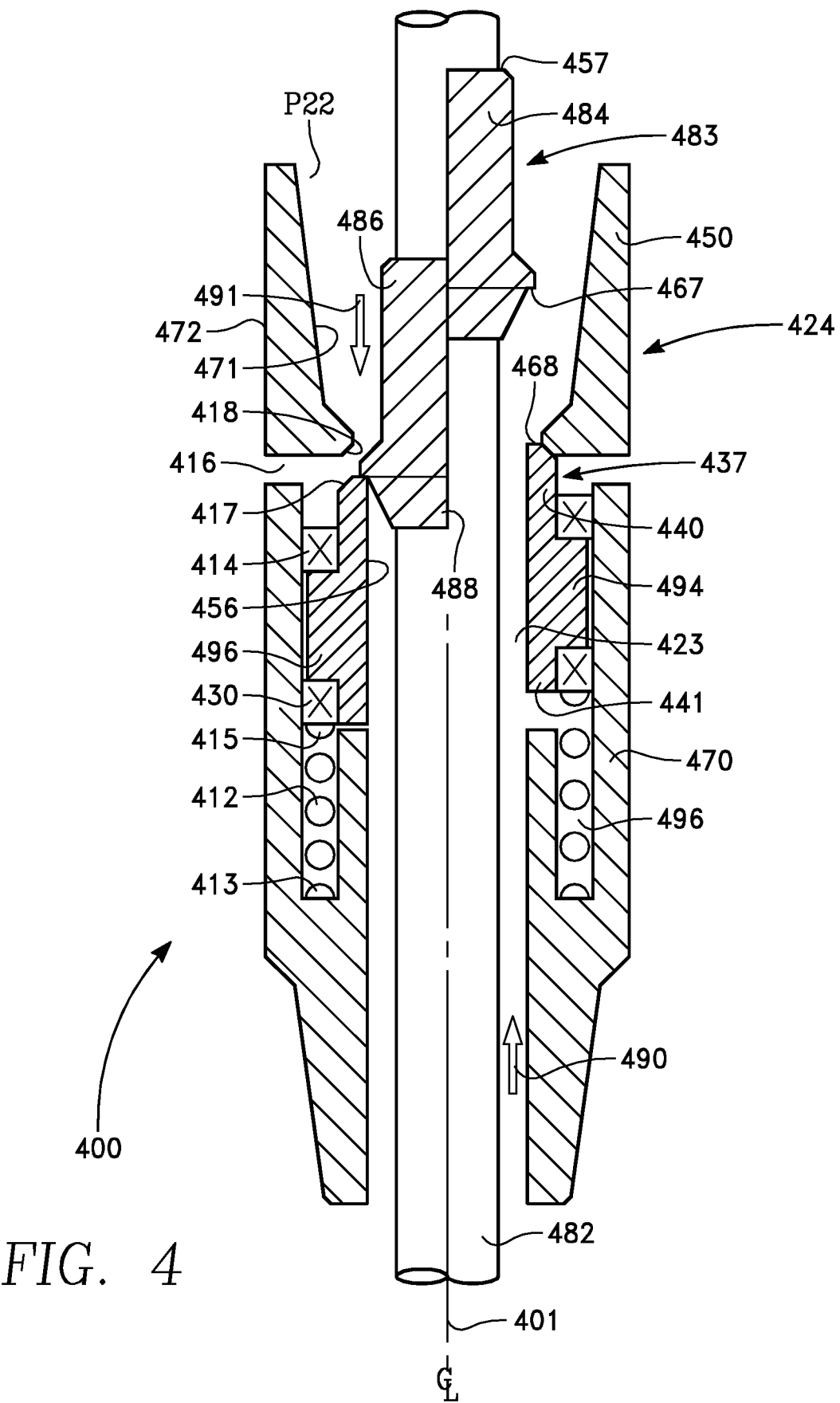
FIG. 4 is a cross-sectional view of a second valve of the flow management system of FIG. 1.

FIG. 4 shows a second bypass valve 400. A valve body 424 houses components including a valve shuttle 437, a valve closure 483, and a charge spring 412. The valve body has a central chamber 423 and a rotatable shaft 482 passes through the central chamber. The shuttle includes an upper section 440 adjacent to a lower section 441.

Upper and lower seals 414, 430 are fitted circumferentially to the upper shuttle section and the lower shuttle section 440, 441. As seen, the seals bear against an inside wall of the valve 4111. In one embodiment, the seals have a curved cross-section such as a circular cross-section. In another embodiment, the seals have a rectangular cross-section (as shown).

In some embodiments, one or more seals 414, 430 have a structure 500 similar to that shown in FIG. 5. Here, a seal body 502 such as a polymeric body has inner and outer lip seals 506, 504 and substantially envelops a charge O-ring 508 such as a silicon rubber ring.

And, in various embodiments, the seals 414, 430 are made from one or more of a rubber, plastic, metal, or another suitable material known to persons of ordinary skill in the art. For example, seal materials include silicone rubber, elastomers, thermoplastic elastomers, and metals that are soft in comparison to the valve body 424, the selection depending, inter alia, on the valve application. In an embodiment, the seals are made from ultra high molecular weight polyethylene.

The shuttle and valve closure 437, 483 have through-holes 456, 457 and the rotatable shaft 482 passes through these through-holes. A first face of the shuttle in the form of a first seat 468 is for sealing against a face of the valve closure 467. In an embodiment, the first seat is near an upper end of the shuttle 440 and the valve closure sealing face is near a lower end of the valve closure 488. In some embodiments, the first valve seat is about radially oriented with respect to the valve body centerline 401. In various embodiments, the shuttle sealing face is integral with or coupled to the shuttle. And, in various embodiments, the valve closure sealing face is integral with or coupled to the valve closure.

A second face of the shuttle 417 is for sealing against a face of the valve body and is in the form of a second seat 418. In an embodiment, the second seat is near an upper section of the valve body 450 and the second face of the shuttle is near an upper end of the shuttle 440. In some embodiments, the second valve seat is about radially oriented with respect to the valve body centerline 401. In various embodiments, the shuttle sealing face is integral with or coupled to the shuttle. And, in various embodiments, the second seat is integral with or coupled to the valve body 424.

About radially arranged and located between upper and mid valve body sections 450, 470 are one or more spill ports 416. Each spill port extends between inner and outer walls of the valve body 471, 472.

Tending to bias the shuttle 437 upward is the charge spring 412. In various embodiments, the charge spring is about radially oriented with respect to the valve body centerline 401 and is seated at a lower end 413 in a slot 496 formed in the valve body center section 470. In an embodiment, an upper end of the spring 415 presses against the shuttle.

Operation of the second bypass valve 400 includes turning of the shaft 482 which is normally the means of operating the pump 104. In normal operation, forces on the shuttle 437 and valve closure 483 determine their position. When the pump 104 is lifting fluid within the tubing and within a designed flow-rate range 490, the shuttle rises to its uppermost position 494 under the influence of the charging spring 412 and the rising fluid lifts the valve closure free of the shuttle 484. Notably, in its uppermost position, the shuttle blocks the spill ports 416 when shuttle sealing face 417 seals with the first seat 418.

When the pump 104 ceases to lift fluid at a sufficient rate, as with back-flow 491, the valve closure contacts the shuttle 486 and the valve closure sealing face 467 seals with the second seat 468. Further, if the force resulting from the pressure above the first seat P22 overcomes the force of the charging spring 412 and the force resulting from the pressure below the valve closure 483, the shuttle is pushed down 496 and the spill port(s) 416 are unblocked allowing fluid in the tubing above the valve to spill outside the valve 400, for example into the annular space between the tubing and the casing 206.

From the above, it can be seen insufficient fluid flow, no fluid flow, or reverse fluid flow cause the valve 400 and pump 104 to be removed from the fluid circuit and/or isolated from the fluid column above the shuttle 437. A benefit of this isolation is protection of the valve and pump. One protection afforded is protection from solids, normally rising with the fluid but now moving toward the valve and pump, that might otherwise foul or block one or both of these components. Blocking the flow path around the shuttle and opening the spill ports 416 removes these solids outside the tubing string 204.

The present invention has been disclosed in the form of exemplary embodiments; however, it should not be limited to these embodiments. Rather, the present invention should be limited only by the claims which follow where the terms of the claims are given the meaning a person of ordinary skill in the art would find them to have.

What is claimed is:

1. A method of protecting a pump comprising the steps of:
    lifting fluid from a hydrocarbon reservoir with the pump;
    providing a valve downstream of the pump, the valve including a shuttle and a valve body;
    providing a shuttle through hole, the through hole including a shuttle chamber interconnecting a first shuttle port and a shuttle passage, the shuttle passage leading to a second shuttle port;
    inserting a spherical closure in the shuttle chamber, the spherical closure free to move within the chamber under the influence of a fluid flow passing through the chamber;

movably inserting the shuttle in a valve body chamber and a positioning a spring between the shuttle and a valve body fixture;

controlling operation of a spill port with a shuttle nose that incorporates the second shuttle port, the spring tending to close the spill port; and, closing the spill port when a) flow carries the spherical closure toward the second shuttle port but does not block the second shuttle port and b) the spring gets longer;

wherein the pump is protected by opening the spill port when a) flow carries the spherical closure to block the first shuttle port and b) the spring gets shorter.

2. The method of claim 1 wherein a shuttle perimeter is for sealing against a valve body interior and for forming a movable seal.

3. The method of claim 2 wherein a cage limits motion of the spherical closure, the cage including a stabilizer that prevents the spherical closure from blocking flow moving from the shuttle chamber to the shuttle passage.

4. The method of claim 2 wherein a spilled flow enters an annulus bounded by a casing.

5. The method of claim 2 wherein the spill port empties into an annulus between a string casing and a string tubing such that a spilled flow replenishes the hydrocarbon reservoir.

6. The method of claim 2 wherein the spring is in a space between a first port end of the shuttle and an end of the valve.

7. The method of claim 2 wherein the second shuttle port is in a conical shuttle closure for mating with a conical valve body seat.

8. The method of claim 2 wherein the shuttle has a first outer diameter at the shuttle chamber and a second outer diameter at the shuttle passage, the first diameter being greater than the second diameter.

9. The method of claim 8 wherein the shuttle has a first inner diameter at the shuttle chamber and a second inner diameter at the shuttle passage, the first diameter being greater than the second diameter.

10. The method of claim 2 further including the step of:
forcing the shuttle to move in a direction that opens the spill port when spring force and pump pressure force on a shuttle end are overcome by a fluid head force on an opposite shuttle end.

* * * * *